United States Patent [19]

Suzuki

[11] Patent Number: 4,897,000

[45] Date of Patent: Jan. 30, 1990

[54] CLAMPING MECHANISM FOR AN APPARATUS FOR DRILLING OR COUNTERSINKING HOLES IN A WORKPIECE

[75] Inventor: Takashi Suzuki, Tokyo, Japan

[73] Assignee: Fuji Jukogyo Kabushiki Kaisha, Tokyo, Japan

[21] Appl. No.: 352,458

[22] Filed: May 16, 1989

[30] Foreign Application Priority Data

May 18, 1988 [JP] Japan .................. 63-120848

[51] Int. Cl.$^4$ .................. B23B 41/00; B23B 47/00
[52] U.S. Cl. .................. 408/79; 227/51; 227/60; 227/61; 408/87; 408/90
[58] Field of Search .................. 29/34 B; 408/75, 80, 408/81, 79, 95, 87, 89, 90; 227/51, 27, 55, 60, 61; 72/453.19

[56] References Cited

U.S. PATENT DOCUMENTS 4,601,618  7/1986  McEldowney .................. 408/75
4,679,969  7/1987  Riley .................. 408/87

FOREIGN PATENT DOCUMENTS 154728  7/1986  Japan .................. 29/34 B
1214338  2/1986  U.S.S.R. .................. 408/87

Primary Examiner—Daniel Howell
Attorney, Agent, or Firm—Beveridge, DeGrandi & Weilacher

[57] ABSTRACT

An apparatus for countersinking rivet holes preformed at circumferential spacings in the fuselage of an airplane and in annular reinforcing ribs of H-shaped cross section in the fuselage at axial spacings. Included is a carrier arm cantilevered to a frame for insertion in the fuselage and reinforcing ribs. The carrier arm has a fluid-actuated cylinder and a fluid motor. The cylinder has a piston rod to which is coupled an offset anvil assembly for pressing the fuselage and a rib against a toolhead mounted to the frame. The piston rod, together with the anvil assembly thereon, is not only linearly displaceable but also rotatable about its own axis. The fluid motor actuates the piston rod for revolving the anvil assembly through an angle of at least 180 degrees. With such angular displacement of the anvil assembly, the apparatus is readily adaptable for countersinking two annular rows of rivet holes formed in those parts of the outer flange of each rib which are on the opposite sides of its web.

7 Claims, 5 Drawing Sheets

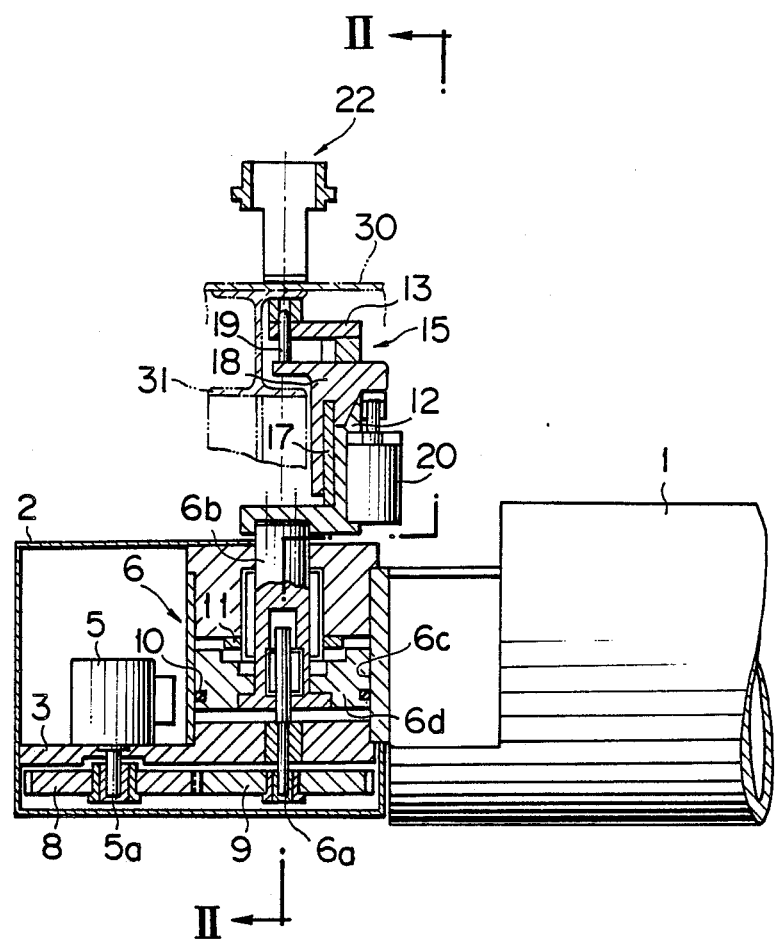
F I G. 1

CLAMPING MECHANISM FOR AN APPARATUS FOR DRILLING OR COUNTERSINKING HOLES IN A WORKPIECE

BACKGROUND OF THE INVENTION

The present invention relates to machining, and more specifically to an apparatus for drilling or countersinking holes in two workpieces of tubular or annular shape, one nested within the other. Still more specifically, the invention pertains to a variable position work holder mechanism in such an apparatus. The apparatus according to the present invention is used in countersinking (counterboring) holes through which annular reinforcing ribs are to be rivetted to the fuselage of an airplane.

The tubular fuselage of the aircraft needs reinforcement to provide a required degree of mechanical strength. The inside surface of the fuselage is secured to several annular ribs with spacings in the axial direction. Annular rows of rivet holes are formed in the fuselage for fastening the ribs and the fuselage. Therefore, prior to riveting, the ribs are held in position against the inside surface of the fuselage, with the rivet holes in the ribs placed in register with those in the fuselage. Then, the aligned rivet holes are successively countersunk (or counterbored) from outside the fuselage. Thereafter, the ribs are rivetted to the fuselage.

There has been proposed an apparatus known in the present applicant for such countersinking of rivet holes in the nested fuselage and reinforcing ribs (see FIGS. 4 and 5). This conventional apparatus has a drawback which arises when each annular reinforcing rib is made of H-shaped or similar cross section. Each annular reinforcing rib has its outer flange held against the inside surface of a fuselage and is fastened thereto by two annular rows of rivets passing through holes in the outer flange. The two rows of rivet holes in the outer flange of each H-section rib are disposed on both sides of its web.

However, when the fuselage with the H-section ribs placed therein is mounted in position on the known apparatus, the holder mechanism of the apparatus can hold the work for countersinking only one of the two rows of rivet holes in each rib together with the associated row of holes in the fuselage. This is because an anvil assembly of the holder mechanism can be positioned only on one side of the web of each rib. Therefore, according to the prior art, the fuselage with the H-section ribs therein must be remounted with its longitudinal direction reversed, for countersinking the other row of rivet holes in each rib.

SUMMARY OF THE INVENTION

The present invention overcomes the problem stated above of the prior art and materially improves the work-handling capabilities of the machines which is used for the foregoing and analogous application.

The present invention is summarized as a clamping mechanism for countersinking or drilling holes in a work. The mechanism includes a carrier arm mounted on a frame for insertion in the work. Carried by the carrier arm is a linear actuator (e.g. fluid actuated cylinder) including a movable member (e.g. piston rod) having an axis about which the movable member is rotatable relative to the carrier arm and along which the movable member is rotatable relative to the carrier arm and along which the movable member is linearly reciprocable relative to the carrier arm toward and away from a toolhead on the frame. The movable member is coupled to offset anvil means for joint rotation and reciprocation therewith, with the anvil means mounted on the movable member being effective to press the work against the toolhead upon movement of the movable member toward the toolhead. A rotary actuator (e.g. fluid motor) is also mounted on the carrier arm and drivingly coupled to the movable member of the linear actuator for imparting rotation thereto, and therefore to the anvil means thereon, through an angle.

The clamping mechanism of the present invention is particularly suited for countersinking rivet holes in an aircraft fuselage and having annular reinforcing ribs of H-shaped cross section. The offset anvil means of the clamping mechanism is placed on one side of the web of each rib to press one part of the outer flange of that rib, and the fuselage, against the toolhead. Then, the row of rivet holes in the outer flange is countersunk with the toolhead. Thereafter, the anvil is revolved 180 degrees for countersinking the other row of rivet holes in the outer flange of the rib. There is no need for remounting the work for countersinking the two rows of rivet holes in each rib.

An additional feature of the present invention is that means is incorporated with the offset anvil means for aligning the rivet holes in the fuselage and in the ribs. Such rivet holes are thus adjusted into precise alignment with each other before countersinking.

However, as will be readily understood, the apparatus is adaptable for both drilling and countersinking rivet holes in the nested fuselage and ribs. A combined drill and countersink may be substituted for the simple countersink for this purpose. The invention contributes to speedy riveting of reinforcing ribs to aircraft fuselages.

A preferred embodiment of the present invention will become understood from, the following detailed description referring to the accompanying drawings.

DESCRIPTION OF THE DRAWINGS

FIG. 1 is a fragmentary vertical section, with parts shown in elevation, through a clamping mechanism in accordance with the present invention;

DETAILED DESCRIPTION

Figure 4:
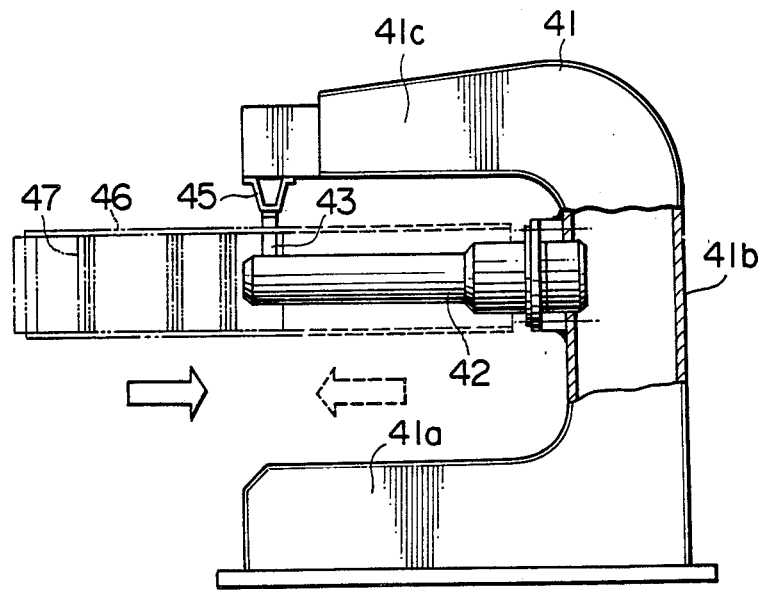
FIG. 4 is an elevation, partly shown broken away for clarity of the known apparatus for countersinking rivet holes in the aircraft fuselage and reinforcing ribs, the fuselage and ribs being shown in phantom outline.

It is considered essential that the known countersinking apparatus be shown and described in more detail in order to make clear the features and advantages of the present invention. As illustrated in FIG. 4, the known apparatus has a frame 41 comprising a base 41a, a column 41b erected on the base, and an arm 41c extending right-angularly from the top of the column 41b. A carrier arm 42 extends horizontally from under the arm 41c. An anvil 43 is fixed on the distal end of the carrier arm 42 so as to receive force from an overlying toolhead 45 depending from the arm 41c.

FIG. 4 also shows a tubular workpiece such as an aircraft fuselage 46, together with a plurality of annular reinforcing ribs 47, mounted around the carrier arm 42. The reinforcing ribs 47 are to be riveted to the fuselage 46.

Figure 5:
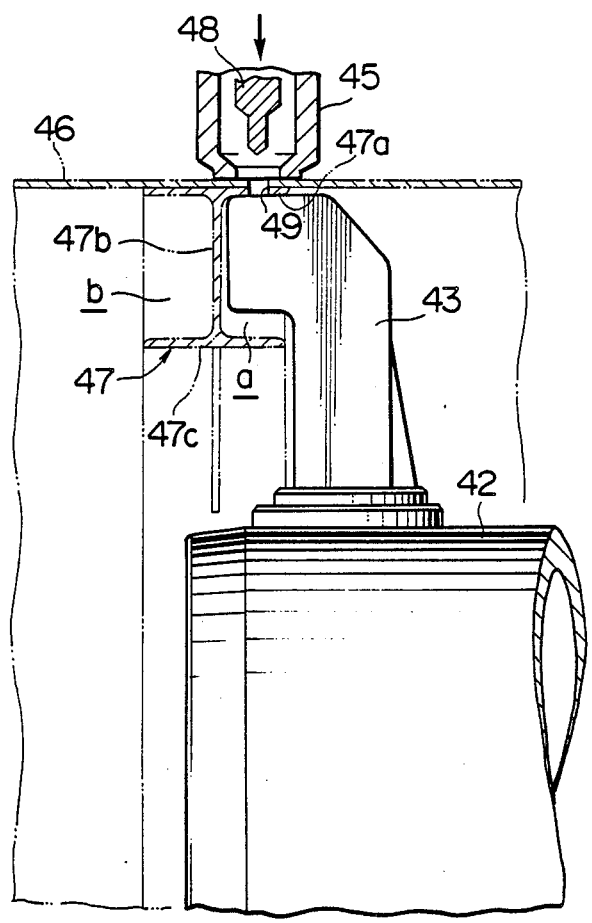
FIG. 5 is an enlarged, fragmentary elevation, with parts shown broken away and parts shown sectioned, of the clamping mechanism of the apparatus of FIG. 4.

As illustrated on an enlarged scale in FIG. 5, the fuselage 46 and one reinforcing rib 47 therein are held between the anvil 43 and the toolhead 45 when the anvil 43 is raised and the toolhead 45 is lowered. A countersinking tool 48 in the toolhead 45 is to be lowered for counterbore the mouth of a rivet hole 49 in the fuselage 46 and each rib 47.

It will be noted from FIG. 5 that each reinforcing rib 47 has a H-shape in cross section, comprising an outer flange 47a, a web 47b and an inner flange 47c. The rivet holes 49 are formed in two annular rows in these parts of the outer flange 47a which extend toward the opposite sides of the web 47b. The anvil 43 has a reversed L shape to fit in a space "a" between the right hand side of the outer flange 47a and the inner flange 47c, as viewed in FIG. 5, of the web 47b without interference with the inner flange 47c. The rivet holes 49 in the right hand side of the outer flange 47a of each rib 47, and the corresponding rivet holes in the fuselage 46, can thus be countersunk without any problem.

However, the anvil 43 as illustrated above cannot possibly be placed in a space "b" on the left hand side of the web 47b. The anvil 43 must be temporarily withdrawn from over the carrier arm 42 and remounted with its longitudinal direction reversed for countersinking the rivet holes in the left hand sides of the outer flanges 47a of the ribs 47.

The present invention eliminates this inconvenience of the known apparatus, as set forth in detail hereafter in terms of a preferable embodiment. The present invention will also be disclosed as adapted, by way of example, for countersinking rivet holes in the aircraft fuselage and in the annular reinforcing ribs nested therein.

Figure 2:
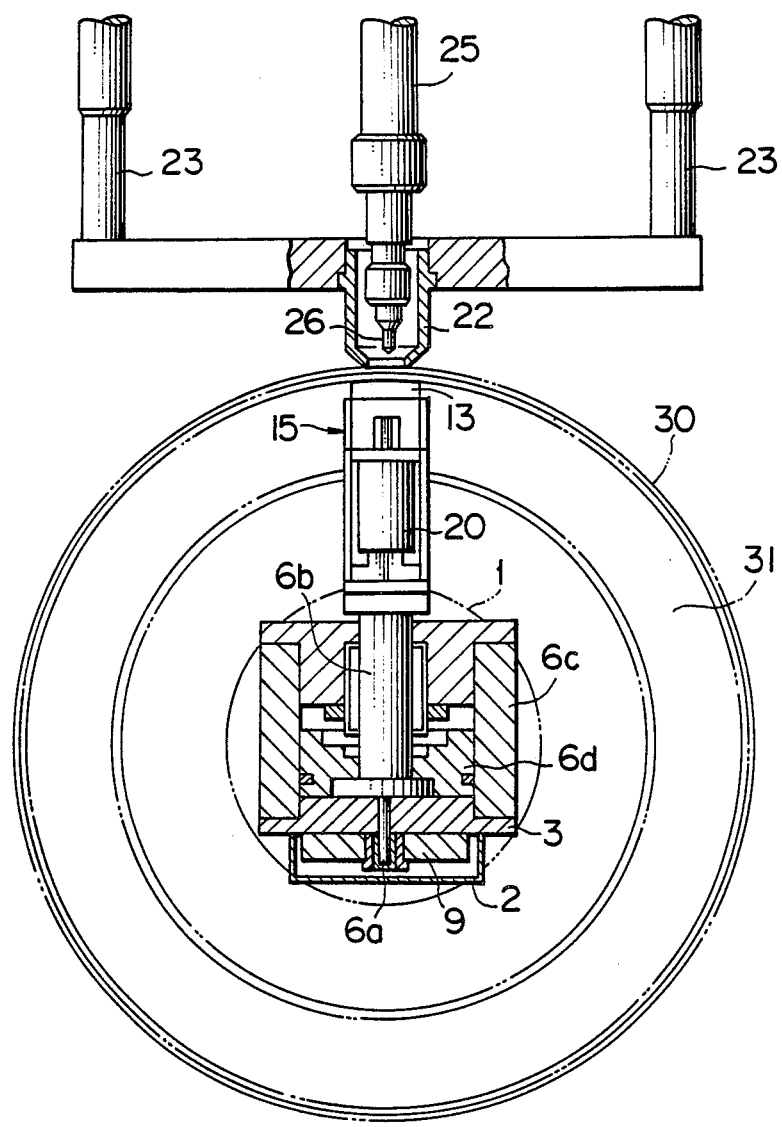
FIG. 2 is a vertical section through the clamping mechanism, taken along the line II—II in FIG. 1.

FIGS. 1 and 2 are illustrations of a clamping mechanism, in accordance with the present invention, constituting part of a countersinking apparatus. The clamping mechanism includes a carrier arm 1. Although FIGS. 1 and 2 show only the clamping mechanism and associated parts necessary for a full understanding of the invention, it is understood that the countersinking apparatus includes a frame such as shown at 41 in FIG. 4. It is therefore apparent that the carrier arm 1 is proximally cantilevered to the column 41b of the frame 41.

Rigidly mounted on the distal end of the carrier arm 1 is a housing 2 having a mounting plate 3 immovably mounted therein. Also, within the housing 2, a rotary actuator 5 and a linear actuator 6 are mounted side by side on the mounting plate 3. The rotary actuator 5 is herein shown as a fluid-actuated motor, preferably pneumatic, and the linear actuator 6 as a fluid-actuated cylinder.

The motor 5 has a drive shaft 5a rotatably extending through the mounting plate 3. The cylinder 6 has a driven shaft 6a rotatably extending through that part of the mounting plate 3 which serves as one of the end caps of the cylinder 6. The drive shaft 5a is drivingly coupled to the driven shaft 6a via two intermeshing gears 8 and 9. Thus, the rotation of the motor 5 is imparted to the driven shaft 6a.

Rotatably extending into the fluid-actuated cylinder 6, the driven shaft 6a is coaxially coupled to a piston rod 6b for joint rotation therewith relative to a cylinder housing 6c. A piston 6d is fixedly mounted on the piston rod 6b for linear reciprocation within the cylinder housing 6c. Thus, the piston rod 6b with the piston 6d thereon not only linearly reciprocates, but also rotates about its own axis with the driven shaft 6a, with respect to the cylinder housing 6c which is in fixed relation to the carrier arm 1. The driven shaft 6a may be keyed or splined to the piston rod 6b for joint rotation therewith, permitting its independent linear displacement. Sealing rings 10 and 11 are installed between the relatively moving parts of the fluid-actuated cylinder 6 for fluid-tight sealing.

The reference numeral 15 indicates an offset anvil assembly mounted on one end of the piston rod 6b projecting from the cylinder housing 6c. The offset anvil assembly 15 as a whole may be recognized as a C-shape.

The offset anvil assembly 15 is provided with an aligning pin 19. Slidably extending through a hole in an anvil member 13, the aligning pin 19 serves the purpose of aligning the preformed rivet holes in the aircraft fuselage 30 and in each reinforcing rib 31 before countersinking. The aligning pin 19 is fixedly mounted on a pin carriage 18. This carriage 18 is linearly reciprocable along a guide rail 17 in a direction parallel to the axis of the piston rod 6b. A second fluid-actuated cylinder 20 on an anvil support 12 has a piston rod coupled to the pin carriage 18 for moving the aligning pin 19 into and out of the preformed rivet holes. In order to clearly distinguish the two fluid-actuated cylinders 6 and 20 from each other, the first cylinder 6 will be hereinafter referred to as the anvil cylinder, and the second cylinder 20 as the pin cylinder.

FIG. 2 clearly indicates that the anvil member 13 is disposed opposite to a toolhead 22. This toolhead 22 is supported by an arm such as shown at in FIG. 4, via support means 23 for movement toward and away from the anvil member 13. The toolhead 22 houses a cutting tool 26 replaceably mounted at the tip of a spindle 25.

The operation of the countersinking apparatus, particularly of its clamping mechanism will be best understood by referring to FIGS. 3A–3G.

Figures 3A, 3B, 3C, 3D:
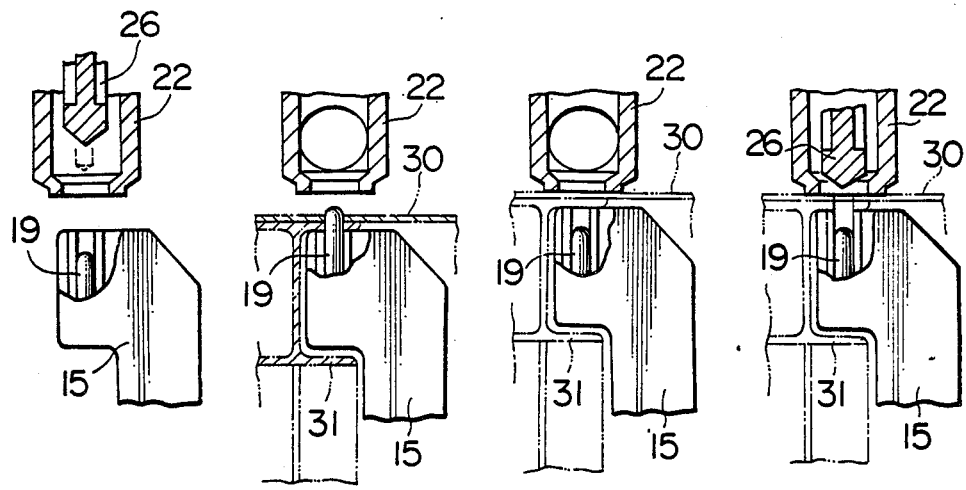
FIGS. 3A-3G are a series of fragmentary, diagrammatic elevations, partly shown broken away and partly sectioned for clarity, showing operational processes for aligning and countersinking rivet holes in the aircraft fuselage and in each reinforcing rib installed therein.

FIG. 3A shows a normal state of the clamping mechanism, that is, the state when the work is not loaded in the apparatus. Both anvil assembly 15 and toolhead 22 are retracted away from each other. Also, the aligning pin 19 is retracted into the anvil assembly 15, and the countersinking tool 26 is raised away from the mouth of the toolhead 22.

In FIG. 3B is shown the aircraft fuselage 30, together with the annular reinforcing ribs 31 placed therein, mounted in position on the apparatus. It will be noted that the anvil assembly 15 is disposed on the right hand side, as viewed in this figure, of the web of one of the reinforcing ribs 31. FIG. 3B also shows the aligning pin 19 driven by the pin cylinder 20 into one of the preformed rivet holes in the right hand half of the outer flange of the rib 31 and into one of the preformed rivet holes in the fuselage 30, thereby aligning the two rivet holes.

Then, as illustrated in FIG. 3C, the anvil cylinder 6 is extended to cause the anvil assembly 15 to press the fuselage 30 and rib 31 against the toolhead 22. Then, the pin cylinder 20 retracts the aligning pin 19 out of the two aligned rivet holes.

Next comes the step of counterboring the outer mouth of the two aligned rivet holes. The countersinking tool 26 is lowered as shown in FIG. 3D, and after countersinking, raised as shown in FIG. 3E.

Figures 3E, 3F, 3G:
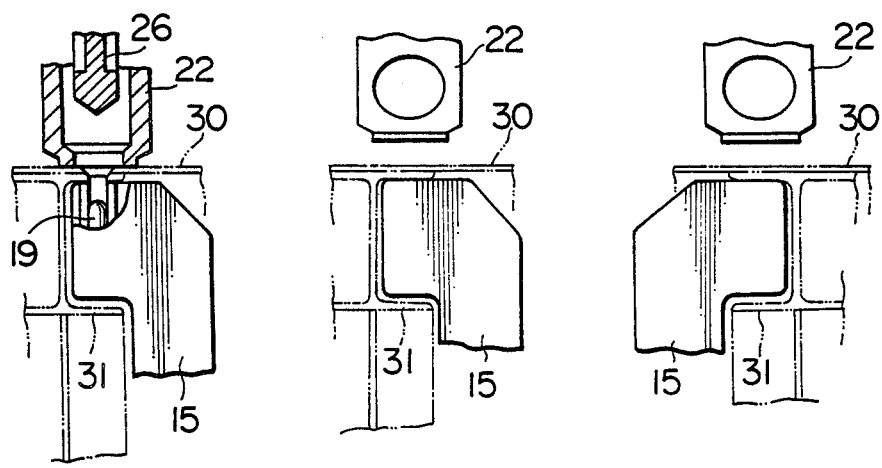

FIG. 3F shows the anvil assembly 15 subsequently retracted away from the toolhead 22 by the contraction of the anvil cylinder 6. One cycle of countersinking operation has now been completed. The same cycle is repeated for countersinking the other rivet holes in the right hand half of the outer flange of the rib 31 and the corresponding rivet holes in the fuselage 30.

For aligning and countersinking the row of rivet holes in the left hand half of the outer flange of the rib 31, and the associated row of rivet holes in the fuselage 30, the anvil assembly 15 must be displaced to the position depicted in FIG. 3G. This displacement of the anvil assembly 15 from its position of FIG. 3F to that of FIG. 3G needs assistance by the carrier arm 1. The anvil assembly 15 is first moved rightward, then downward, then leftward, then, after having been revolved 180 degrees about the axis of the anvil cylinder 6, upward, and then rightward, as viewed in FIGS. 3F and 3G. After the anvil assembly 1 is thus carried to the position of FIG. 3G, the countersinking cycle described above is resumed and repeated for countersinking the rivet holes in the left hand half of the outer flange of the rib 31 and the associated holes in the fuselage 30.

The 180-degree revolution of the foregoing anvil assembly displacement from its position of FIG. 3F to the position of FIG. 3G is accomplished by the carrier arm 1. The fluid-actuated motor 5 causes the 180-degree revolution of the anvil assembly 15. The rotation of this motor 5 is transmitted from the drive shaft 5a to the driven shaft 6a via the gears 8 and 9, and thence to the piston rod 6b of the anvil cylinder 6. The offset anvil assembly 15 revolves with this piston rod 5B about the axis of the latter.

According to the present invention, the speedily countersinking of the two rows of rivet holes is preformed in both halves of the outer flange of each reinforcing rib 31 of H-shaped cross section with the tubular fuselage 30. As will be readily understood, however, the illustrated apparatus may be used for both drilling and countersinking rivet holes in the fuselage and reinforcing ribs, merely by replacing the countersinking tool 26 with a tool known as a combined drill and countersink.

While the presently preferred embodiment of the present invention has been shown and described, it will be understood that the disclosure is for the purpose of illustration and that various changes and modifications may be made without departing from the scope of the invention as set forth in the appended claims.

What is claimed is:

1. An apparatus for drilling and countersinking holes in a tubular work, comprising:
   (a) a frame;
   (b) a toolhead supported by the frame;
   (c) a carrier arm mounted on the frame for insertion in the work;
   (d) a linear actuator mounted on the carrier arm and including a movable member having an axis about which the movable member is rotatable relative to the carrier arm and along which the movable member is reciprocable relative to the carrier arm toward and away from the toolhead;
   (e) offset anvil means coupled to the movable member of the linear actuator for pressing the work against the toolhead; and
   (f) a rotary actuator mounted on the carrier arm and drivingly coupled to the movable member of the linear actuator for imparting rotation to the movable member.

2. The apparatus of claim 1, wherein the linear actuator is a fluid-actuated cylinder, and the movable member is a piston rod of the fluid-actuated cylinder.

3. The apparatus of claim 2, wherein the piston rod of the fluid-actuated cylinder has a driven shaft coaxially coupled therein for joint rotation therewith.

4. The apparatus of claim 3, wherein the rotary actuator is a motor having a drive shaft drivingly coupled to the driven shaft of the fluid-actuated cylinder.

5. The apparatus of claim 4, further comprising a housing mounted on the carrier arm with the drive shaft of the motor coupled to the driven shaft of the fluid-actuated cylinder via gearing.

6. An apparatus for aligning and countersinking holes preformed in a tubular workpiece, comprising:
   (a) a frame;
   (b) a toolhead supported by the frame;
   (c) a carrier arm mounted on the frame for insertion in the workpieces;
   (d) a linear actuator mounted on the carrier arm including a movable member having an axis about which the movable member is rotatable relative to the carrier arm and along which the movable member is reciprocable relative to the carrier arm toward and away from the toolhead;
   (e) offset anvil means coupled to the movable member of the linear actuator for pressing the workpiece against the toolhead;
   (f) an aligning pin supported on the anvil means for movement into and out of holes in the workpiece;
   (g) pin drive means mounted on the anvil means for moving the aligning pin relative to the anvil means into and out of the holes in the workpiece; and
   (h) a rotary actuator mounted on the carrier arm and drivingly coupled to the movable member of the linear actuator for rotating the movable member, and the anvil means coupled thereto, through an angle of at least 180 degrees.

7. The apparatus of claim 6, wherein the pin drive means comprises:
   (a) a pin carriage mounted on the anvil means for linear reciprocation and having the aligning pin rigidly mounted thereto; and
   (b) a second linear actuator mounted on the anvil means and coupled to the pin carriage for linearly reciprocating the anvil mean.

* * * * *